United States Patent [19]

Tomoda et al.

[11] Patent Number: 4,941,542
[45] Date of Patent: Jul. 17, 1990

[54] AUTOMOTIVE FOUR WHEEL STEERING SYSTEM

[75] Inventors: Atsuo Tomoda; Takaaki Itoh; Takao Kijima, all of Hiroshima, Japan

[73] Assignee: Mazda Motor Corporation, Hiroshima, Japan

[21] Appl. No.: 363,432

[22] Filed: Jun. 7, 1989

Related U.S. Application Data

[63] Continuation of Ser. No. 101,687, Sep. 28, 1987, abandoned.

[30] Foreign Application Priority Data

Oct. 1, 1986 [JP] Japan ................ 61-235037
Oct. 2, 1986 [JP] Japan ................ 61-235020

[51] Int. Cl.⁵ ............................................ B62D 6/02
[52] U.S. Cl. ...................................... 180/140; 180/141
[58] Field of Search .............. 180/140, 133, 136, 153, 180/154, 158; 92/60

[56] References Cited

U.S. PATENT DOCUMENTS

| | | | |
|---|---|---|---|
| 2,482,792 | 9/1949 | Owen | 92/60 X |
| 2,575,937 | 11/1951 | Bent | 92/60 X |
| 3,878,763 | 4/1975 | Lang | 180/133 X |
| 3,892,165 | 7/1975 | Lioux | 92/60 X |
| 3,893,377 | 7/1975 | Mannetje | 92/60 |
| 4,679,809 | 7/1987 | Ito et al. | 280/91 |
| 4,700,960 | 10/1987 | Miki et al. | 180/140 X |

FOREIGN PATENT DOCUMENTS

| | | | |
|---|---|---|---|
| 58-183351 | 10/1983 | Japan . | |
| 60-166561 | 8/1985 | Japan . | |
| 60-166562 | 8/1985 | Japan . | |
| 60-166563 | 8/1985 | Japan . | |
| 60-166564 | 8/1985 | Japan . | |
| 60-166565 | 8/1985 | Japan | 280/91 |
| 60-166566 | 8/1985 | Japan . | |
| 61-57463 | 3/1986 | Japan . | |
| 61-200064 | 9/1986 | Japan . | |
| 1274953 | 12/1986 | U.S.S.R. | 180/158 |

*Primary Examiner*—Charles A. Marmor
*Assistant Examiner*—Alan M. Kagen
*Attorney, Agent, or Firm*—Burns, Doane, Swecker & Mathis

[57] ABSTRACT

An automotive vehicle having a fluid-operated, four wheel steering system for steering not only the front wheel pair, but also the rear wheel pair as a function of the amount of turn of the front wheel pair with respect to the direction of straightforward run of the vehicle. The system makes use of a front cylinder operatively associated with a steering gear assembly and a rear cylinder operated by a fluid medium supplied from the front cylinder for steering the rear wheel pair. In order for the steering system to be responsive to the vehicle running speed thereby to control the amount of turn of the rear wheel pair appropriate for a particular range of vehicle running speed, a device is provided for accommodating a portion of the fluid medium to be supplied to the rear cylinder when the pressure of the fluid medium increases to a value higher than a predetermined pressure. Increase of the fluid pressure over the predetermined value takes place when the steering wheel is turned during the low speed run of the vehicle.

8 Claims, 6 Drawing Sheets

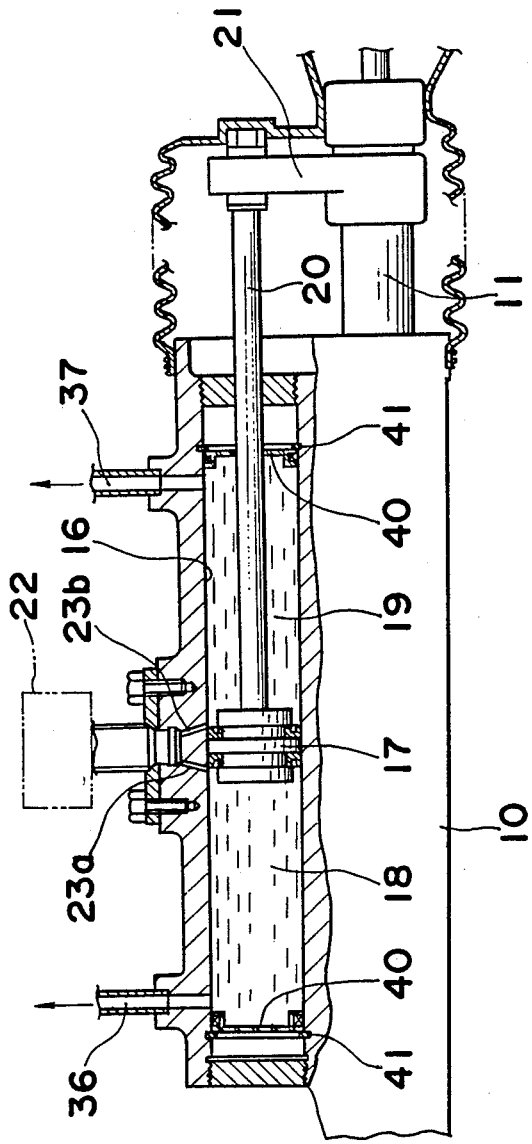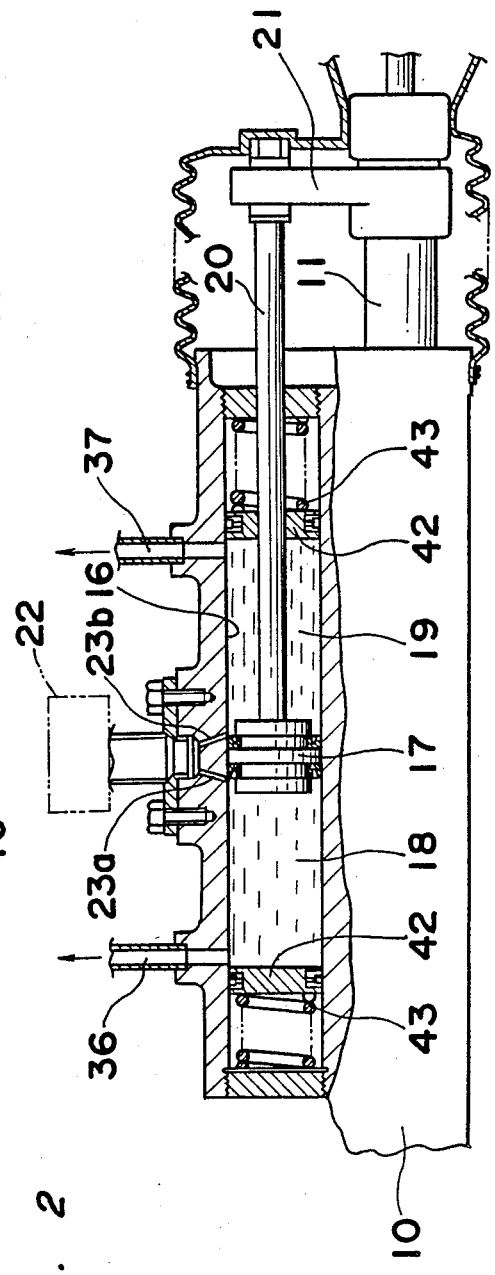

AUTOMOTIVE FOUR WHEEL STEERING SYSTEM

This application is a continuation of application Ser. No. 101,687, filed Sept. 28, 1987, now abandoned.

BACKGROUND OF THE INVENTION

Field of the Invention

The present invention generally relates to an automobile steering system and, more particularly, to a fluid-operated, four wheel steering system for the simultaneous steering of front and rear pairs of automotive wheels.

The development of the multi-wheel steering system in which a plurality of wheel pairs are simultaneously steered by a single steering wheel maneuvered by a driver is not new, however, the practical use of it in passenger cars is a recent trend. The multi-wheel steering system currently designed for four wheel passenger cars is available in two varieties, a mechanical linkage system and a fluid-operated system. An example of fluid-operated, four wheel steering system is disclosed in, for example, the Japanese Laid-open Patent Publication No. 58-183351, laid open to public inspection on Oct. 16, 1983, and is reproduced in FIG. 14 of the accompanying drawings for the purpose of discussion of the prior art believed to be pertinent to the present invention.

Referring to FIG. 14, there is shown a layout of the fluid-operated, four wheel steering system in relation to front and rear pairs of wheels generally identified by 1 and 4, respectively. A steering knuckle for each front wheel 1 has a spindle 7a for the support thereon of the respective front wheel 1 and a knuckle arm 7b, a free end of said knuckle arm 7b being articulatingly coupled with a respective tie rod 8a. Similarly, the rear wheels 4 are supported by respective steering knuckles each having a spindle 9a for the support thereon of the respective rear wheel 4 and a knuckle arm 9b articulated at a free end thereof to a respective tie rod 8b.

The illustrated steering system comprises a steering gear assembly 2 comprised of, for example a connecting rod 11, provided at a substantially intermediate portion thereof with a rack gear and having its opposite ends pivotally connected with the tie rods 8a, and a pinion gear constantly meshed with the rack gear and operatively coupled with a steering shaft 2a. The steering shaft 2a has a steering wheel 2b rigidly mounted on one end thereof remote from the steering gear assembly 2.

A front cylinder 3 having a piston rod 3a whose opposite ends protrude outwardly from the front cylinder housing is rigidly secured to the housing for the steering gear assembly 2 with the piston rod 3a extending parallel to the longitudinal axis of the connecting rod 11. This front cylinder 3 is described as having left-hand and right-hand working chambers separated from each other by a piston member rigidly mounted on a substantially intermediated portion of the piston rod 3a.

A rear cylinder or rear wheel steering cylinder 5 is similar in structure to the front cylinder 3 and has a piston rod 5a whose opposite ends protrude outwardly from the rear cylinder 5 and are in turn pivotally coupled with the respective tie rods 8b. This rear cylinder 5 is also described as having left-hand and right-hand working chambers separated from each other by a piston member rigidly mounted on a substantially intermediate portion of the piston rod 3a. As a matter of practice, the housing for the rear cylinder 5 is rigidly secured to a portion of the automobile body structure with the piston rod 5a extending parallel to the widthwise direction of the automobile body structure.

As shown, a pair of pipe lines, generally identified by 6, are used, one connecting between the left-hand working chamber of the front cylinder 3 and the right-hand working chamber of the rear cylinder 5 and the other connecting between the right-hand working chamber of the front cylinder 3 and the left-hand working chamber of the rear cylinder 5.

For driving the piston rod 3a of the front cylinder 3, a motion translator generally identified by 35 is employed which comprises a gear box, secured rigidly to the housing of the steering gear assembly 2 and having a pinion gear meshed with the rack gear on the connecting rod 11, a cranking lever 35a having one end coupled with the pinion gear in the gear box and the other end pivotally connected with one of the opposite ends of the piston rod 3a through a connecting link 35b. This motion translator 35 is so designed and so structured that the rotation of the steering wheel 2b in one of the opposite directions from a neutral position about the steering shaft 2a can result in an axial sliding motion of the piston rod 3a. More specifically, so far as the steering wheel 2b is rotated in one of the opposite directions through a relatively small angle from the neutral position, the piston rod 3a can be axially moved in one direction, however, the further rotation of the steering wheel 2b through the increased angle can result in reversal of the direction of sliding motion of the piston rod 3a. It is described that the reversal of the direction of motion of the piston rod 3a takes place when the cranking lever 35a being pivoted moves past a position at which it aligns with the connecting link 35b.

Thus, according to the prior art fluid-operated, four wheel steering system, when the steering wheel 2b is rotated a relatively small angle about the steering shaft 2a from the neutral position to turn the front wheels 1 in one direction, the rear wheels 4 can also be turned in the same direction as the front wheels 1, but when the steering wheel 2b is further rotated to turn the front wheels 1 further in said one direction, the rear wheels 4 can be swung in the other direction towards a normal straight position, in which the rear wheels 4 assume a parallel relationship with the longitudinal sense of the automobile body, or a position in which the rear wheels 4 are turned in a direction opposite to the direction in which the front wheels 1 are turned.

The above mentioned Japanese publication describes that the amount of turn of the rear wheel pair in one direction from the normal straight position which the rear wheel pair assumes during the straight run of the vehicle can be differentiated from that of the front wheel pair by selecting either the length of the cranking lever or the ratio of the inner bore diameter of one of the front and rear cylinders relative to that of the other of the front and rear cylinders. This is because, as clearly stated in the above mentioned Japanese publication, the distance over which the piston rod in the rear cylinder determinative of the amount of turn of the rear wheel pair moves corresponds to the amount of a fluid medium forced to flow into the rear cylinder.

The prior art steering system discussed above is satisfactory in that the use of the fluid circuit including the pipe lines provides a freedom of layout of the steering system with a view to a more efficient space utilization within the vehicle envelope, as compared with the mechanical variant wherein a motion transmitting shaft and differential gears are used. However, since the front and rear cylinders are fluid-connected together in a closed fluid circuit, the ratio of turn of the rear wheel pair relative to that of the front wheel pair when the steering wheel is turned in either direction from the neutral position, or the rear-to-front steering ratio for short, tends to be fixed at all times once the system has been designed. This is in contrast to the established notion that the rear-to-front steering ratio if variable according to the vehicle speed would bring about a favorable steerability.

SUMMARY OF THE INVENTION

Accordingly, the present invention has been devised with a view to substantially eliminating the problems inherent in the prior art fluid-operated, four wheel steering system and has for its essential object to provide an improved fluid-operated, four wheel steering system wherein the amount of turn of the rear wheel pair from the normal straight position which the rear wheel pair assumes during the straight run of the automotive vehicle can be controlled according to the vehicle running speed.

To this end, there is provided according to the present invention an improved fluid-operated, four wheel steering system for an automotive vehicle having front and rear wheel pairs and a steering wheel drivingly coupled with the front wheel pair for steering the vehicle with respect to the direction of run of the vehicle, which system comprises a fluid-operated cylinder means actuated in response to the rotation of an automotive steering wheel from a neutral position; a fluid-operated rear cylinder means for steering the rear wheel pair for turning the rear wheel pair with respect to the direction of straightforward run of the vehicle; a fluid passage means for operatively coupling the front and rear cylinder means together to permit a fluid medium to be supplied from the front cylinder means to the rear cylinder means thereby to actuate the rear cylinder means; and a fluid medium accommodating means provided in either one of the front cylinder means, the rear cylinder means and the fluid passage means for accommodating a portion of the fluid medium when the pressure of the fluid medium increases to a value higher than a predetermined value.

In accordance with the present invention, when the automotive vehicle is running at a high speed, and when the automobile driver wishes to turn the vehicle in one direction, the required steering force with which the steering wheel is rotated generally suffices to be small and, therefore, the pressure of the fluid medium to be supplied from the front cylinder means to the rear cylinder means to turn the rear wheel pair relative to the direction of straightforward run of the vehicle would not increase so much and remain below the predetermined value. In such case, the rear wheel pair can be turned an amount as much as the amount of turn of the front wheel pair in the same direction as the front wheel pair, thereby to stabilize the steerability.

On the other hand, the steering force required during a low speed run of the automotive vehicle to turn the vehicle is generally great and, therefore, the pressure of the fluid medium to be supplied from the front cylinder means to the rear cylinder means increases correspondingly to a value higher than the predetermined value. This increase of the fluid pressure can be relieved by the fluid medium accommodating means thereby to reduce the amount of turn of the rear wheel pair so that the cornering characteristic of the vehicle can be advantageously improved.

The fluid medium accommodating means according to the present invention is so designed as to provide a substantial fail-safe capability wherein, in the event of the occurrence of a lock of the rear wheel steering, the front wheel can remain steerable.

Thus, with the use of the fluid medium accommodating means according to the present invention, the rear-to-front steering ratio can be advantageously adjusted according to the vehicle running speed.

It is to be noted that the reason that the relatively small steering force is sufficient during the high speed run of the vehicle is partly because, for a given amount of turn desired, the yawing rate of the vehicle body mass during the high speed run is so large as to reduce the slip angle of the wheels and, therefore, the self-aligning torque necessary to permit the wheels to be self-aligned is small, partly because the high speed run of the vehicle is accompanied by a lift of the vehicle with the wheel-to-ground load (the load imposed by the vehicle on the road surface through the tires) reduced enough to reduce the self-aligning torque, and partly because as a result of the centrifugal force acting on the vehicle during the high speed, the surface area of contact of the wheels (tires) with the road surface is reduced enough to reduce the self-aligning torque of the wheels.

BRIEF DESCRIPTION OF THE DRAWINGS

This and other objects and features of the present invention will become clear from the following description taken in conjunction with preferred embodiments thereof with reference to the accompanying drawings, in which:

FIG. 1 is a longitudinal sectional view of a front cylinder used in a fluid-operated, four wheel steering system, in which cylinder a first embodiment of a fluid medium accommodating means is incorporated;

FIG. 2 is a view similar to FIG. 1, showing a modified form of the front cylinder of FIG. 1;

DETAILED DESCRIPTION OF THE EMBODIMENTS

Figure 3:
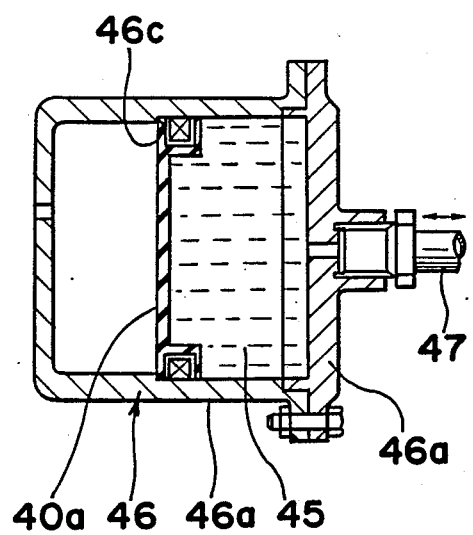
FIGS. 3 and 4 are longitudinal sectional views, each on an enlarged scale, showing a second preferred embodiment, and a variant thereof, of the fluid medium accommodating means, respectively.

Before the description of the present invention proceeds, it is to be noted that like parts are designated by like reference numerals throughout the accompanying drawings.

As is well known to those skilled in the art, the four wheel steering system permits both of a pair of the front wheels and a pair of the rear wheels to be steered simultaneously or substantially simultaneously in a predetermined relationship, and, therefore, some or all of the established design parameters which are generally included in the concept of "front-end geometry," such as angular relationship between the front wheels, the front wheel attaching parts and the car frame and including, for example, the toe-in of the front wheels and the tilt of the front wheels from vertical, may be equally applicable to the rear wheel system. Also, it is very well known that the front wheels tend to toe out during turns, exhibiting a predetermined steering geometry wherein the angle of swing about the steering axis differs between the left-hand front wheel and the right-hand front wheels. This toe-out may also occur in the rear wheel system in the case of the four-wheel steerable automotive vehicle.

In view of the foregoing, the terms "amount of turn of the front wheel pair" and "amount of turn of the rear wheel pair" both used hereinbefore and hereinafter are to be understood as meaning the compromise angle of swing of a single integer of the front wheels and the compromise angle of swing of a single integer of the rear wheels, respectively, relative to the direction of straight run of the automotive vehicle. While the amount of turn of the front wheel pair is a direct function of the angle of rotation of the steering wheel, that is, the steering angle, the amount of turn of the rear wheel pair may or may not be a direct function of the steering angle, but is to be determined according to a desired rear wheel steering geometry which may or may not be identical with the front wheel steering geometry.

Figure 7:
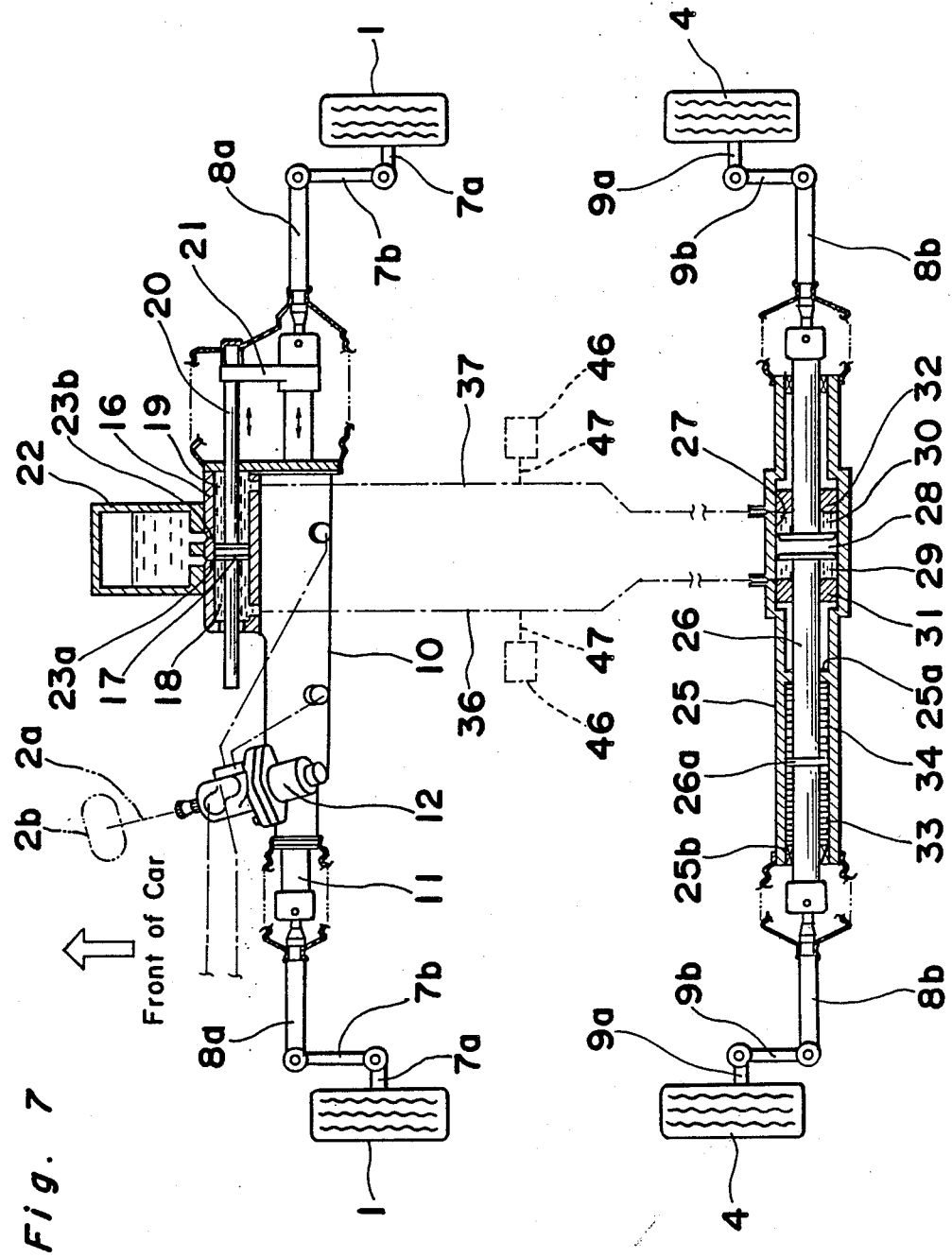
FIG. 7 is a schematic sectional diagram showing the basis of the fluid-operated, four wheel steering system.

Referring first to FIG. 7 schematically illustrating the basis of a fluid-operated, four wheel steering system for simultaneously steering automotive front and rear wheel pairs, a steering gear assembly is shown as including a generally tubular rack housing 10 rigidly secured to a vehicle front body portion so as to extend in a direction widthwise of the vehicle body structure, a rack bar (or front wheel steering rod) 11 extending axially slidably through the rack housing 10 with its opposite ends situated outside the rack housing 10, a substantially intermediate portion of said rack bar 11 within the rack housing 10 being formed with a rack gear (not shown), and a gear box 12 secured to the rack housing 10 and accommodating therein a pinion gear (not shown) which is drivingly meshed with the rack gear on the rack bar 11. The pinion gear within the gear box 12 is in turn coupled with the steering wheel 2b through the steering shaft 2a. It is to be noted that, in FIG. 7, only for the purpose of drawing, the steering wheel 2b and its associated parts are exaggeratedly depicted as positioned on a leading side with respect to the direction of forward run of the automotive vehicle.

The opposite outer ends of the rack bar 11 are pivotally connected with the knuckle arms 7b through the tie rods 8a, respectively, so that the axial sliding movement of the rack bar 11 caused by the rotation of the steering wheel 2b from a neutral position about the steering shaft 2a can cause the front wheels 1 to swing in one of the opposite directions from a normal straight position which the front wheel pair assumes when the steering wheel 2b is in the neutral position.

The rack housing 10 carries a front cylinder 16 rigidly secured thereto so as to extend parallel thereto. The front cylinder 16 has a piston rod 20 axially slidably extending therethrough with its opposite ends situated outside the front cylinder 16, the interior of said front cylinder 16 being divided into left-hand and right-hand fluid chambers 18 and 19 by a piston member 17 that is rigidly mounted on the piston rod 20 for movement together therewith within the front cylinder 16. One of the opposite, outer ends thereof as viewed in FIG. 7, is coupled with the rack bar 11 through a connecting arm 21 so that the movement of the rack bar 11 can be accompanied by the corresponding axial movement of the piston rod 20.

Rigidly mounted on the front cylinder 16 is a reservoir tank 22, the interior of which is communicated with the left-hand and right-hand fluid chambers 18 and 19 in the front cylinder 16 through ports 23a and 23b defined in the wall of the front cylinder 16 for supplementing the fluid medium, for example, the hydraulic medium, which has leaked, from the reservoir tank 22 into the left-hand and right-hand fluid chamber 18 and 19 in the front cylinder 16.

The illustrated steering system also includes a generally tubular rod casing 25 rigidly secured to a vehicle rear body portion so as to extend in a direction widthwise of the vehicle body structure and having a rear steering rod 26 axially slidably extending therethrough with its opposite ends situated outside the rod casing 25, said opposite ends of the rear steering rod 26 being in turn pivotally connected with the knuckle arms 9b through the associated tie rods 8b.

A rear cylinder 27 determinative of the amount of turn of the rear wheel pair is defined within a right-hand half of the rod casing 25 as shown in FIG. 7 and comprises spaced annular end wall members 31 and 32 fixedly housed within the rod casing 25 and spaced a distance from each other so as to define a cylinder interior within the rod casing 25 and between the end wall members 31 and 32. The cylinder interior referred to above is divided into left-hand and right-hand fluid chambers 29 and 30 by a piston member 28 rigidly mounted on the rear steering rod 26 for movement together therewith, said end wall members 31 and 32 concurrently serving as a stopper means for defining the distance over which the piston member 28 and, hence, the piston rod 26 can move.

Within the left-hand half of the rod casing 25, a spring chamber is defined. This spring chamber is delimited by the left-hand end portion of the rod casing 25 and a pair of annular spring seat members 25a and 25b and is divided into two chamber parts by an annular engagement 26a which is rigidly mounted on, or otherwise integrally formed with, the rear steering rod 26. The spring chamber accommodates therein compression springs 33 and 34, the compression spring 33 being interposed between the spring seat member 25b and the annular engagement 26a whereas the compression spring 34 is interposed between the spring seat member 25a and the annular engagement 26a.

While the axial movement of the rear steering rod 26 results in the swinging motion of the rear wheel pair in one of the opposite directions from the normal straight position which the rear wheel pair assumes when the steering wheel 2b is in the neutral position, that is, during the straight run of the vehicle, the compression springs 33 and 34 counteract with each other so as to impart a tendency for the rear wheel pair to assume the normal straight position with the piston member 28 held in position intermediate between the end wall members 31 and 32 as shown.

The front cylinder 16 is operatively associated with the rear cylinder 27 by means of a first fluid passage 36 communicating the respective left-hand fluid chambers 18 and 29 of the front and rear cylinders 16 and 27 together and a second fluid passage 37 communicating the respective right-hand fluid chambers 19 and 30 of the front and rear cylinders 16 and 17 together.

In the construction so far described, it is clear that, when the steering wheel 2b is rotated in one direction from the neutral position to turn the front wheel pair in one direction from the normal straight position, for example, leftwards with respect to the direction of forward run of the vehicle, the rack bar 11 is displaced leftwards as viewed in FIG. 7 with the piston member 17 on the piston rod 20 consequently displaced leftwards. Once this occurs, a fluid medium within the left-hand fluid chamber 18 in the front cylinder 16 is forced to flow into the left-hand fluid chamber 31 of the rear cylinder 27 through the first fluid passage 36 to increase the pressure inside the left-hand fluid chamber 29 of the rear cylinder 27. Consequent upon the increase of the pressure inside the left-hand fluid chamber 29, the rear steering rod 26 is displaced rightwards, resulting in the leftward swing of the rear wheel pair.

Conversely, when the steering wheel 2b is rotated in the opposite direction from the neutral position to turn the front wheel pair rightwards from the normal straight position, the piston rod 20 is displaced rightwards in response to the rightward displacement of the rack bar 11 with the piston member 17 consequently forcing a fluid medium within the right-hand fluid chamber 19 in the front cylinder 16 to flow through the second fluid passage 37 into the right-hand fluid chamber 30 of the rear cylinder 27 to increase the pressure inside the right-hand fluid chamber 30. Consequent upon the increase of the pressure inside the right-hand fluid chamber 30, the rear steering rod 26 is displaced leftwards, resulting in the rightward swing of the rear wheel pair.

Figure 8:
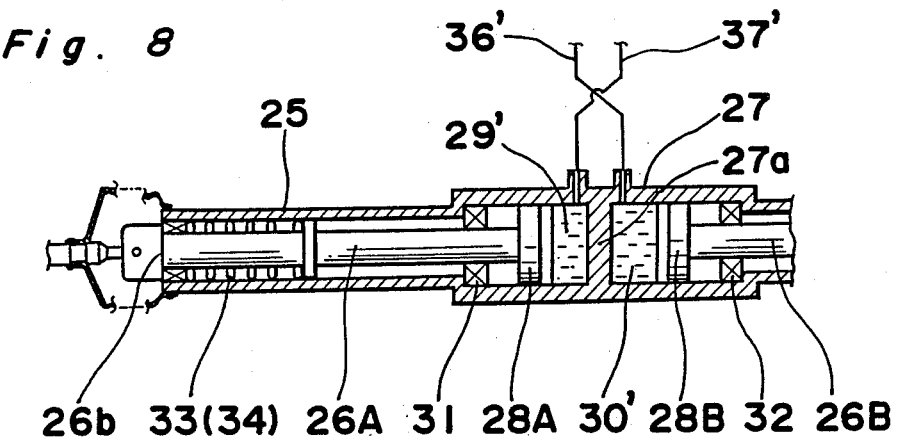
FIG. 8 is a partial longitudinal sectional view of the rear cylinder, showing a modification thereof.
Figure 13A:
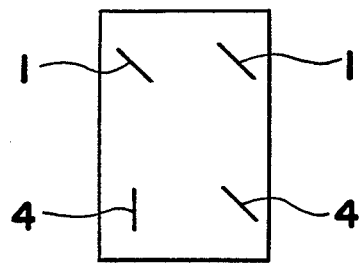
FIGS. 13(a) and 13(b) are schematic diagrams showing the respective manners in which the front and rear pairs of the wheels are swung when the automotive vehicle is desired to be turned leftwards and rightwards, respectively.

However, if as shown in FIG. 8 the rear steering rod 26 extending through the rod casing 25 is divided into left-hand and right-hand rear steering rods 26A and 26B and, on the other hand, separate piston members 28A and 28B are rigidly mounted on, or otherwise integrally formed with, respective inner ends of the left-hand and right-hand rear steering rods 26A and 26B while being axially slidably accommodated respectively within left-hand and right-hand fluid chambers 29' and 30' that are defined within the rear cylinder 27 and separated from each other by a partition wall 27a, and, also, if the right-hand and left-hand fluid chambers 30' and 29' are communicated with the left-hand and right-hand fluid chambers 18 and 19 in the front cylinder 16 through respective first and second fluid passages 36' and 37', the fluid medium can be forced to flow through the first fluid passage 36' only into the right-hand fluid chamber 30', when the front wheels 1 are swung leftwards from the normal straight position, to drive only the right-hand rear steering rod 26B rightwards so that, as shown in FIG. 13(a), only the right-hand rear wheel 4 can be swung leftward (that is, in a direction in which the toe-in takes place) while the left-hand rear wheel 4 is prevented by a stopper 26b of the left-hand rear steering rod 26A from being swung leftwards (that is, in a direction in which the toe-out takes place).

Figure 13B:
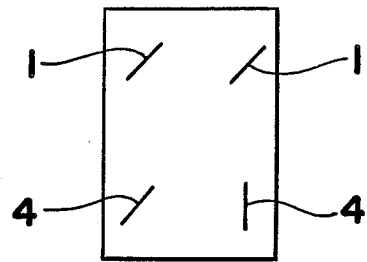
Figure 14:
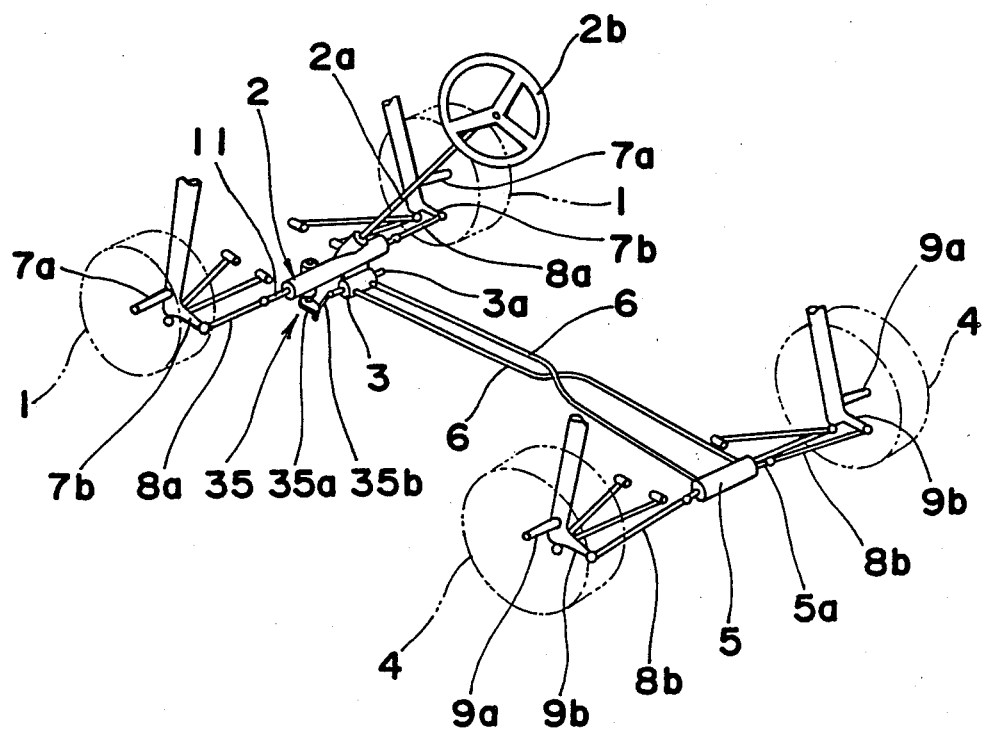
FIG. 14 is a schematic perspective skeletal view showing the prior art fluid-operated, four wheel steering system.

Similarly, when the front wheels 1 are swung rightwards from the normal straight position, the fluid medium can be forced to flow through the second fluid passage 36' only into the left-hand fluid chamber 29' to drive only the left-hand rear steering rod 26A leftwards so that, as shown in FIG. 13(b), only the left-hand rear wheel 4 can be swung rightwards (that is, in a direction in which the toe-in takes place) while the right-hand rear wheel 4 is prevented by a stopper 26b of the right-hand rear steering rod 26B from being swung rightwards (that is, in a direction in which the toe-out takes place).

The use of the structure shown in and described with reference to FIG. 8 is advantageous in that any possible movement of one of the rear wheels 4 in an unstable direction relative to the other of the rear wheels 4, which would occur in the event of break-down of the pressure of the fluid medium, can be assuredly avoided.

A first preferred embodiment of a means for accommodating the fluid medium to permit the amount of turn of the rear wheel pair from the normal straight position to be reduced in the event of the increase of the fluid pressure over a predetermined value is illustrated in FIG. 1. The fluid medium accommodating means show in FIG. 1 comprises a generally disc-shaped elastic member 40 fixedly accommodated within each of the front cylinder 16 at a location spaced a certain distance inwardly from the adjacent end wall of the front cylinder 16. Specifically, the disc-shaped elastic member 40 within each of the fluid chambers 18 and 19 has its peripheral edge fluid-tightly sealed to the wall of the front cylinder 16 and fixed in position by a respective retaining ring 41 so that it will not be moved by the fluid medium confined between the elastic member 40 and the piston member 17, it being, however, to be noted that each of the elastic members 40 can undergo an elastic deformation only when the pressure of the fluid medium within the associated fluid chamber 18 or 19 increases to a value higher than a predetermined value.

In this construction, the system operates in the following manner when the front wheel pair is desired to be swung in one of the opposite directions from the normal straight position, for example, leftwards with respect to the direction of forward straight run of the automotive vehicle. Assuming that the automotive vehicle is running at a high speed, the required steering force generally suffices to be small and, therefore, the pressure of the fluid medium inside the left-hand fluid chamber 18 in the front cylinder 16 would not increase so much and remain below the predetermined value. In such case, the left-hand elastic member 40 does not elastically deform outwardly and, consequently, the amount of the fluid medium forced to flow through the first fluid passage 36 into the left-hand fluid chamber 20 of the rear cylinder 27 does not decrease.

Figure 12:
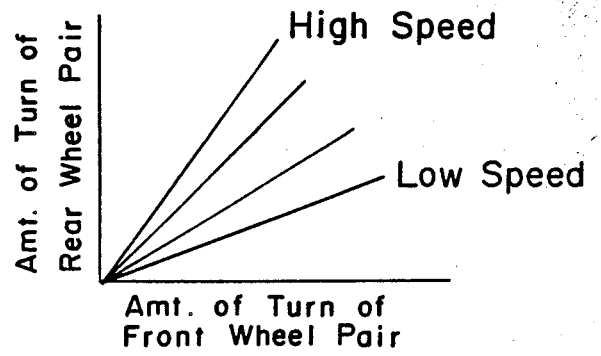

Accordingly, during the high speed drive of the automotive vehicle, the amount of turn of the rear wheel pair is, as shown in FIG. 12, relatively great in proportion to the amount of turn of the front wheel pair, and the rear wheel pair is swung in the same direction as that in which the front wheel pair is swung. Because of this, the steering stability during the high speed run can be advantageously improved.

On the other hand, the steering force required during a low speed drive of the automotive vehicle is generally great and, therefore, the pressure of the fluid medium within the left-hand fluid chamber 18 increases correspondingly to a value higher than the predetermined value. The increase of the fluid pressure within the left-hand fluid chamber 18 results in the outward deformation of the associated elastic member 40 against its own elasticity with the consequence that the amount of the fluid medium which corresponds to the amount of deformation of the elastic member 40 is accommodated in a concave space delimited by the deformed elastic member 40. In other words, in response to the increase of the fluid pressure within the left-hand fluid chamber 18, the elastic member 40 confronting the fluid chamber 18 is outwardly deformed to accommodate a portion of the fluid medium in the fluid chamber 18 in a quantity corresponding to the amount of deformation of such elastic member 40. Therefore, the amount of the fluid medium forced to flow through the first fluid passage 36 into the left-hand fluid chamber 29 of the rear cylinder 27 is reduced.

Because of the reason stated in the preceding paragraph, as shown in FIG. 12, during the low speed drive of the automotive vehicle, the amount of turn of the rear wheel pair is reduced to a value smaller than that during the high speed drive of the automotive vehicle although the rear wheel pair is swung in the same direction as that in which the front wheel pair is swung. Therefore, the cornering characteristic of the automotive vehicle during the low speed run can be improved.

FIG. 2 illustrates a variant of the front cylinder 16 shown in FIG. 1. According to the variant shown in FIG. 2, instead of the elastic members 40 shown in FIG. 1, generally disc-shaped rigid piston members 42 are employed, which piston members 42 are accommodated within the respective fluid chambers 18 and 19 for sliding movement in a direction longitudinally of the front cylinder 16. A compression spring 43 for each piston member 42 is interposed between the adjacent end wall of the front cylinder 16 and the associated piston member 42 so that, when the pressure of the fluid medium within the associated fluid chamber 18 or 19 increases to a value higher than the predetermined value, the respective compression spring 43 can be axially inwardly compressed to permit the associated piston member 42 to displace in a direction close towards the adjacent end wall of the front cylinder 16.

It will readily be seen that the front cylinder 16 of the construction shown in FIG. 2 operates in a manner substantially identical to that shown in FIG. 1.

A second preferred embodiment of the fluid medium accommodating means is illustrated in FIG. 3, reference to which will now be made. While the fluid medium accommodating means shown in and described with reference to any one of FIGS. 1 and 2 is incorporated in the front cylinder 16, the fluid medium accommodating means according to the embodiment shown in FIG. 3 comprises flow control valves one for each of the first and second fluid passages 36 and 37, which valves are generally identified by 46 in FIG. 7. As best shown in FIG. 3, each of the flow control valves 46 comprises a generally cup-like container 46a having its opening closed by a lid 46b, and a generally disc-shaped elastic member 40a accommodated within the container 46a and having its peripheral edge sealed and firmly engaged to an annular shoulder 46c on the wall of the container 46a in a manner similar to the elastic member 40 shown in and described with reference to FIG. 1.

The interior of the container 46 is thus divided by the elastic member 40a into an atmospheric chamber and a fluid chamber 45, said fluid chamber 45 being communicated with the associated first or second fluid passage 36 or 27 as shown in FIG. 7 through a connecting tube 47.

It will readily be seen that, when the pressure of the fluid medium flowing through one of the first and second fluid passages 36 and 37 increases to a value higher than the predetermined value, the associated elastic member 40a is deformed outwardly with respect to the fluid chamber 45 to accommodate the fluid medium in such one of the first and second fluid passages 36 and 37 in a quantity corresponding to the amount of deformation of the associated elastic member 40a.

Figure 4:
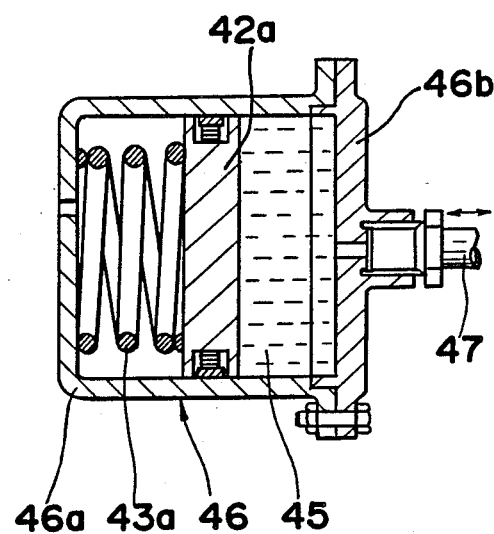

A modified form of each flow control valve 46 is illustrated in FIG. 4. The modified flow control valve 46 shown therein makes use of a generally disc-shaped rigid piston member 42a, and a compression spring 43a interposed between the bottom of the container 46a and the rigid piston member 42a within the container 46a, in a manner substantially similar to the rigid piston member 42 and the associated compression spring 43a shown in and described with reference to FIG. 2.

Figure 5:
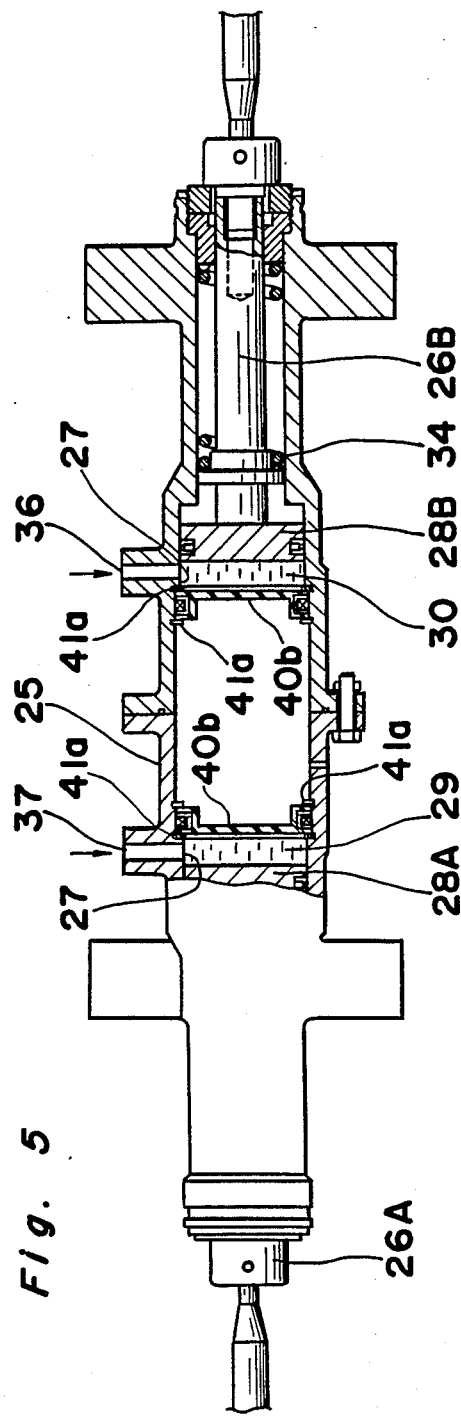
FIG. 5 is a longitudinal sectional view of a rear cylinder used in the fluid-operated, four wheel steering system, in which cylinder a third embodiment of the fluid medium accommodating means is incorporated.

A third preferred embodiment of the fluid medium accommodating means is shown in FIG. 5 and may be considered another variant of the first preferred embodiment of FIG. 1.

Referring now to FIG. 5, instead of the partition wall 27a used in the rear cylinder 27 of FIG. 8, elastic members 40b similar to the elastic members 40 shown in FIG. 1 are accommodated within the rear cylinder 27 in spaced relation to each other. More specifically, while respective peripheral edges of the elastic members 40b are sealed to the wall of the rear cylinder 27, the elastic members 40b are fixedly retained in position inside the rear cylinder by respective annular retaining rings 41a with a space between the elastic members 40b being rendered to be void so that the left-hand and right-hand fluid chambers 29 and 30 in the rear cylinder 27 can be defined between the piston member 28A and the elastic member 40b and between the piston member 28B and the elastic member 40b, respectively.

Figure 6:
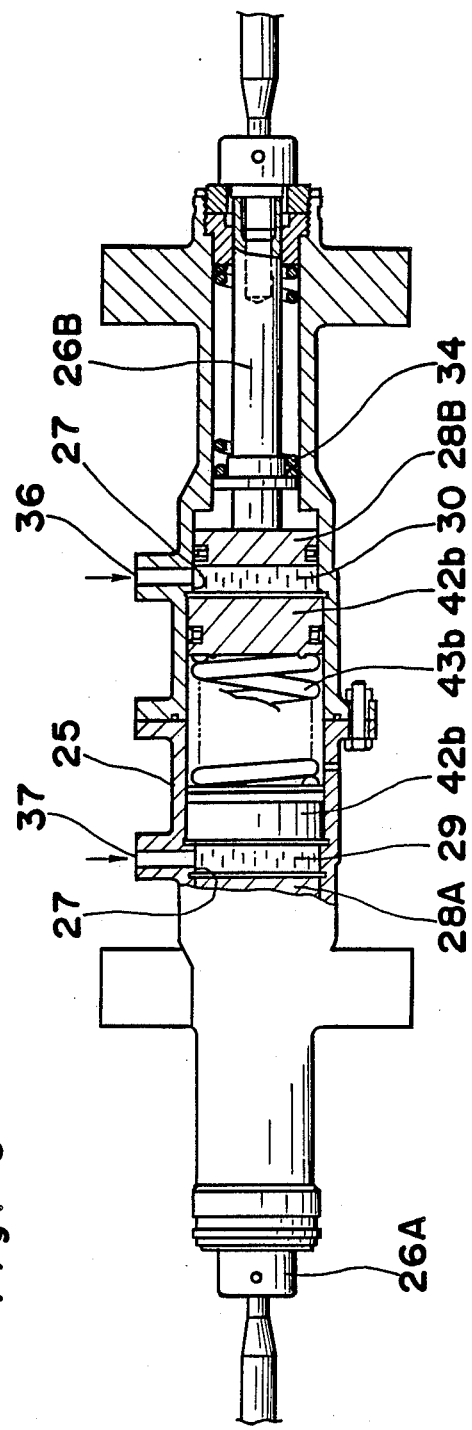
FIG. 6 is a view similar to FIG. 5, showing a modified form of the rear cylinder of FIG. 5.

A variant of the embodiment of FIG. 5 is shown in FIG. 6 wherein, instead of the elastic members 40b shown in and described with reference to FIG. 5, piston members 42b similar to the piston members 42 shown in and described with reference to FIG. 2 are employed. These piston members 42b are accommodated within the rear cylinder 27 for movement in a direction axially thereof and are normally biased by a common compression spring 43b, interposed between the rigid piston members 42b, in a direction away from each other.

Figure 9:
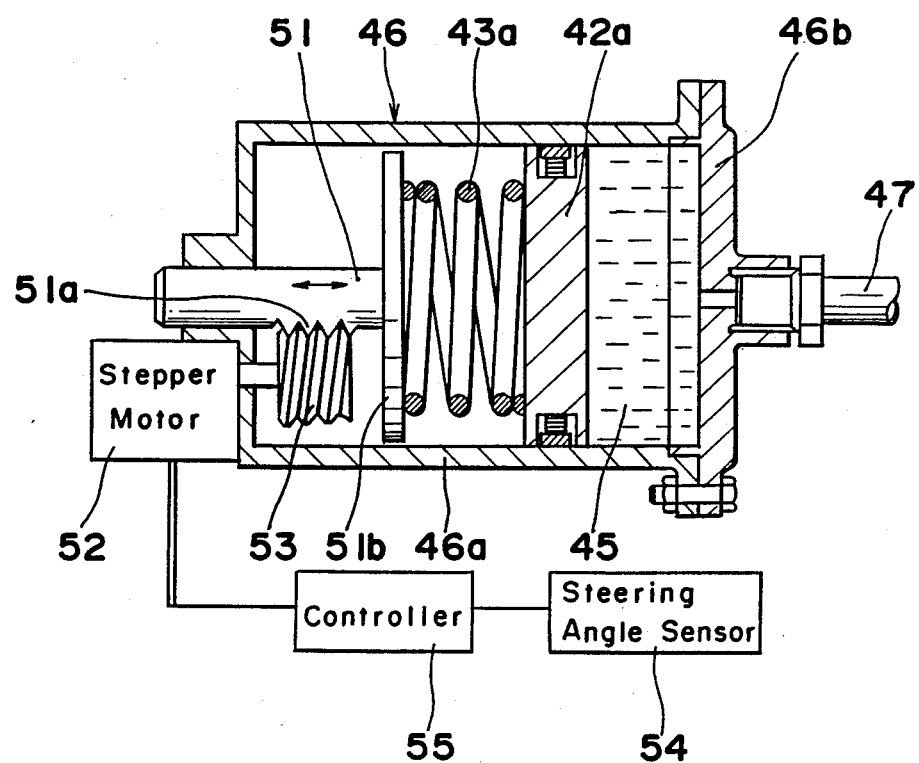
FIG. 9 is a view similar to FIG. 3, showing a fourth embodiment of the fluid medium accommodating means.

A fourth preferred embodiment of the fluid medium accommodating means is shown in FIG. 9, reference to which will now be made.

The flow control valve shown in FIG. 9 and provided for each of the first and second fluid passages 36 and 37 as shown by the phantom lines in FIG. 7 is generally similar to that shown in FIG. 4, except that the biasing force exerted by the compression spring 43a shown in FIG. 9 is made adjustable as a function of the steering angle through which the steering wheel 2b (FIG. 7) is rotated from the neutral position. For this purpose, the flow control valve includes an adjustment rod 51 having a rack gear area 51a defined on a portion thereof and axially movably extending through a bottom wall of the container 46a in alignment with the direction of movement of the rigid piston member 42a. One end of the adjustment rod 51 situated within the interior of the container 46a has a spring seat member 51b rigidly secured thereto or otherwise integrally formed therewith, against which seat member 51b one end of the compression spring 43a remote from the rigid piston member 42a is seated. The rack gear area 51a on the adjustment rod 51 may be positioned either outside or inside the container 46a and is constantly meshed with a worm gear 53 drivingly coupled with a stepper motor 52.

The stepper motor 52 is controlled by a controller 55 that is electrically connected with a steering angle sensor 54. The steering angle sensor 54 detects, and generates an electric signal indicative of, the steering angle through which the steering wheel 2b is rotated from the neutral position, the controller 55 in response to the signal from the sensor 54 generating a pulse of a duration which is a function of the steering angle.

While the system of FIG. 9 including the flow control valve 46 and the electric circuit is used for each of the first and second fluid passages 36 and 37 (FIG. 7), a single combination of the controller and the steering angle sensor may be employed for controlling the stepper motor associated with the first fluid passage 36 and also the stepper motor associated with the second fluid passage 37. In such case, the steering angle sensor may be so designed as to generate a positive-going signal, when the steering wheel 2b is rotated in one of the opposite directions from the neutral position, but a negative-going signal when it is rotated in the other of the opposite directions from the same neutral position. Also, instead of the steering angle sensor or sensors, a sensor or sensors for detecting the axial displacement of the rack bar 11 (FIG. 7) may be employed.

Figure 10:
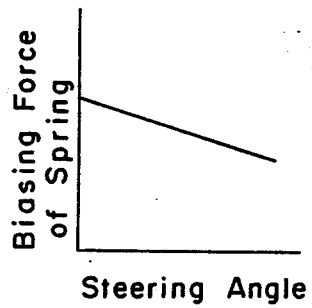
FIG. 10 is a graph showing the relationship between the biasing force of a compression spring used in the fluid medium accommodating means and the steering angle through which the steering wheel is rotated.

In any event, according to the present invention, the gearing system including the rack gear area 51a and the worm gear 53 is so designed that the adjustment rod 51 can be moved leftwards as viewed in FIG. 9, when the steering angle is relatively great, thereby to reduce the biasing force exerted by the compression spring 43a on the rigid piston member 42a as shown in FIG. 10. Specifically, the greater the steering angle, the smaller the biasing force of the compression spring 43a. Therefore, when the steering angle is great, a correspondingly large amount of the fluid medium forced to flow through the associated first or second fluid passage 36 or 37 can be accommodated within the fluid chamber 45 than when the steering angle is small.

Figure 11:
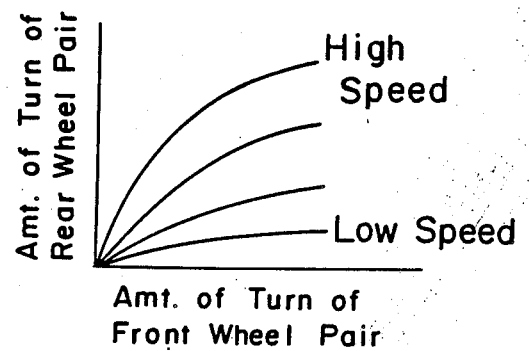
FIGS. 11 and 12 are graphs, each showing the relationship between the amount of turn of the rear wheel pair and that of the front wheel pair, which are associated with the embodiments shown in FIG. 9 and FIG. 3, respectively.

The embodiment of FIG. 9 makes it possible to permit a relatively large amount of the fluid medium to be drawn into the fluid chamber 45 as the steering angle increases, thereby to suppress the amount of turn of the rear wheel pair as shown in FIG. 11. Thus, the embodiment of FIG. 9 is particularly advantageous in that the rear-to-front steering ratio can be set to any desired value with improvement in accuracy of the response to the vehicle speed.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. In an automotive vehicle having front and rear wheel pairs and a steering wheel drivingly coupled with the front wheel pair for steering the vehicle with respect to the direction of run of the vehicle, said steering wheel being rotatable in opposite directions from a neutral position at which the vehicle can run straightforward, a fluid-operated, four wheel steering system which comprises:

a front wheel steering mechanism including a front steering rod that is adapted to steer the front wheel pair in response to rotation of the steering wheel;

a fluid-operated front cylinder means actuated in response to the rotation of the steering wheel from the neutral position, said front cylinder means including a front piston member that is mechanically coupled to the front steering rod for movement in response to rotation of the steering wheel, said front cylinder means having first and second front cylinder chambers positioned on opposite sides of said front piston member, said first front cylinder chamber having a volume that is adapted to be reduced when the steering wheel is rotated to turn the front wheel pair leftwards with respect to the direction of movement of the vehicle, and the second front cylinder chamber having a volume that is adapted to be reduced when the steering wheel is rotated to turn the front wheel pair rightwards with respect to the direction of movement of the vehicle;

a fluid-operated rear cylinder means for steering the rear wheel pair for turning at least one rear wheel of the rear wheel pair with respect to the direction of straightforward run of the vehicle, said rear cylinder means including a first rear cylinder assembly and a second rear cylinder assembly, said first rear cylinder assembly being adapted to cause a right-hand rear wheel of the rear wheel pair to turn when supplied with a fluid medium and said second rear cylinder assembly being adapted to cause a left-hand rear wheel of the rear wheel pair to turn when supplied with a fluid medium;

said front and rear wheel pairs being adapted to turn in the same direction;

a fluid passage means for operatively coupling the front and rear cylinder means together to permit a fluid medium to be supplied from the front cylinder means to the rear cylinder means to thereby actuate the rear cylinder means, said fluid passage means including a first fluid passage that communicates the first front cylinder chamber with the first rear cylinder assembly for supplying fluid medium under pressure to the first rear cylinder assembly and a second fluid passage that communicates the second front cylinder chamber with the second rear cylinder assembly for supplying fluid medium under pressure to the second rear cylinder assembly; and a fluid medium accommodating means disposed in the rear cylinder means for accommodating a portion of the fluid medium being supplied from the front cylinder means to the fluid-operated rear cylinder means only when the pressure of the fluid medium in the front cylinder means increases such that the pressure in the rear cylinder means increases to a value greater than a predetermined value as a result of rotation of the steering wheel when the automotive vehicle is traveling at relatively low speeds, said fluid medium accommodating means being operable to accommodate a portion of the fluid medium independent of the turn of the rear wheel pair.

2. The steering system as claimed in claim 1, wherein the fluid medium accommodating means comprises a piston member forming an end wall of each of the first and second rear cylinder assemblies and a biasing means for exerting a biasing force on a rear surface of each of the piston members, said piston members being movable against the biasing force when the pressure inside the respective rear cylinder assembly becomes higher than the predetermined value.

3. The steering system as claimed in claim 1, wherein said rear cylinder means is used to turn both rear wheels forming the rear wheel pair with respect to the direction of straightforward run of the vehicle.

4. The steering system as claimed in claim 1, wherein the rear cylinder means is operable to toe in one of the rear wheels, forming the rear wheel pair, which is situated outwardly with respect to the center of curvature of the path along which the vehicle is turned.

5. The steering system as claimed in claim 4, wherein said front steering rod has opposite ends that are operatively coupled with respective front wheels forming the front wheel pair and wherein said first rear cylinder assembly includes a first rear piston member disposed inside one end of a first rear steering rod operatively coupled with a right-hand rear wheel forming a part of the rear wheel pair, and a first rear cylinder supporting the first rear piston member for sliding movement within the first rear cylinder, said second rear cylinder assembly including a second rear piston member disposed inside one end of a second rear steering rod operatively coupled with a left-hand rear wheel forming the other part of the rear wheel pair, and a second rear cylinder supporting the second rear piston member for sliding movement within the second rear cylinder.

6. The steering system as claimed in claim 5, wherein each of said first and second rear steering rods is provided with a toe-out stopper for restricting the toe-out of the associated rear wheel.

7. The steering system as claimed in claim 3, further comprising a reservoir tank and wherein the front cylinder means is provided with first and second communicating passages leading from the reservoir tank to the first and second front cylinder chambers, both of said first and second front cylinder chambers being communicated with the reservoir tank when and so long as the front steering rod is in a neutral position corresponding to the neutral position of the steering wheel.

8. The steering system as claimed in claim 5, further comprising a reservoir tank and wherein the front cylinder means is provided with first and second communicating passages leading from the reservoir tank to the first and second front cylinder chambers, both of said first and second front cylinder chambers being communicated with the reservoir tank when and so long as the front steering rod is in a neutral position corresponding to the neutral position of the steering wheel.

* * * * *